United States Patent

Pfister et al.

[11] 4,050,027
[45] Sept. 20, 1977

[54] OPTICAL SIGNAL AMPLIFIER

[75] Inventors: Gustav R. Pfister, Webster; James C. Maher, Sodus, both of N.Y.

[73] Assignee: Xerox Corporation, Stamford, Conn.

[21] Appl. No.: 710,484

[22] Filed: Aug. 2, 1976

[51] Int. Cl.² ............................................... H03F 3/04
[52] U.S. Cl. ......................................... 330/5; 330/4.5
[58] Field of Search ............................ 330/5, 4.5, 4.6; 250/199

*Primary Examiner*—Palmer C. Demeo
*Assistant Examiner*—Darwin R. Hostetter

*Attorney, Agent, or Firm*—James J. Ralabate; Richard A. Tomlin; Max J. Kenemore

[57] ABSTRACT

Amplification of optical signals propagating through a first waveguide is achieved by modulation of high intensity light propagating through an elastomeric waveguide responsive to said signals, the modulation of the high intensity light being accomplished by an apparatus including a photodiode for registering the modulation of the optical signals and an electrode arrangement for causing corresponding light-modulating deformation of the elastomeric waveguide, the circuitry between photodiode and the electrode arrangement including a resistor and a D.C. power source.

1 Claim, 2 Drawing Figures

OPTICAL SIGNAL AMPLIFIER

BACKGROUND OF THE INVENTION

This invention relates generally to integrated optics and, more particularly, to optical amplifiers for light propagating through a waveguide.

Integrated optics has assumed a major role in information handling, communications and data processing systems. It is attractive because of the wide inherent bandwidth of optical devices and because of the many specialized features of optical waveguides.

Optical data links can be made to be smaller, cheaper and more reliable than their conventional counterparts. They are less susceptible to information degradation from electromagnetic interference, vibration, temperature changes and crosstalk. Where secrecy in communications is important, integrated optics offer the important advantages of electrical isolation and increased communications security.

In some communications applications it is sometimes necessary or desirable to propagate optical signals through waveguides many miles in length. Although many highly efficient waveguide configurations and materials are known, the intensity of optical signals is observed to diminish over great distances. Amplification of the signal then becomes desirable.

An apparatus which amplifies such signals by a simple and direct method is sought. It is especially desirable to obtain an amplification apparatus which minimizes the conversion of the signal through various modes in order to achieve amplification. More specifically, it is desirable to minimize the use of expensive and complex electrical circuitry during amplification.

The modulation of light propagating in an elastomeric waveguide by deforming the waveguide with electrodes is disclosed in the commonly assigned copending application Ser. No. 621,312, filed Oct. 10, 1975. However, amplification of an optical signal propagating in a waveguide is not disclosed or suggested therein.

SUMMARY OF THE INVENTION

It is therefore an object of the present invention to afford an apparatus for amplifying optical signals propagating through a waveguide.

It is another object of the present invention to furnish a simple and economical apparatus for amplifying optical signals propagating through a waveguide.

It is still another object of the present invention to supply an apparatus for amplifying optical signals propagating through a waveguide which minimizes the use of electrical circuitry.

These and other objects are achieved by an apparatus which comprises, generally speaking, a set of electrodes, the members of the set being arranged to contact opposite sides of an elastomeric optical waveguide having unmodulated light of high intensity propagating therethrough. The set of electrodes is connected to an electrical circuit such that one electrode is connected to the positive terminal of a D.C. power source, and the opposing electrode is connected to the negative terminal of the power source through a photodiode. The photodiode is adapted to register the optical signals from a first waveguide. A resistor is placed across the circuit between the photodiode and the positive terminal of the D.C. power source. The resistance of the resistor is equal to or less than about 1/10 that of the dark resistance of the photodiode, and the light resistance of the photodiode is equal to or less than about 1/10 that of the resistor. The response frequency of the apparatus is equal to or less than $1/2\omega_{max}$ where Wmax is $2\pi$ times the maximum modulation frequency. Light modulating deformations in the elastomeric waveguide are caused by the electrodes whenever a field of sufficient strength is created therebetween.

Modulated light from the first waveguide means is directed so as to impinge the photodiode. In the dark, the photodiode has a resistance of at least about 10 times that of the resistor, and no field is created between the electrodes. However, in the light, the resistance of the photodiode drops to at least about 1/10 that of the resistor, and a field is created between the electrodes. The field is of sufficient strength to displace the electrodes sandwiching the elastomer toward each other. Such displacement results in light-modulating deformations in the elastomeric waveguide. High intensity light propagating through the elastomeric waveguide is modulated corresponding to the modulation of the light in the first waveguide means. Amplification of a modulated light signal is thus achieved.

DETAILED DESCRIPTION OF THE DRAWINGS

Figure 1:
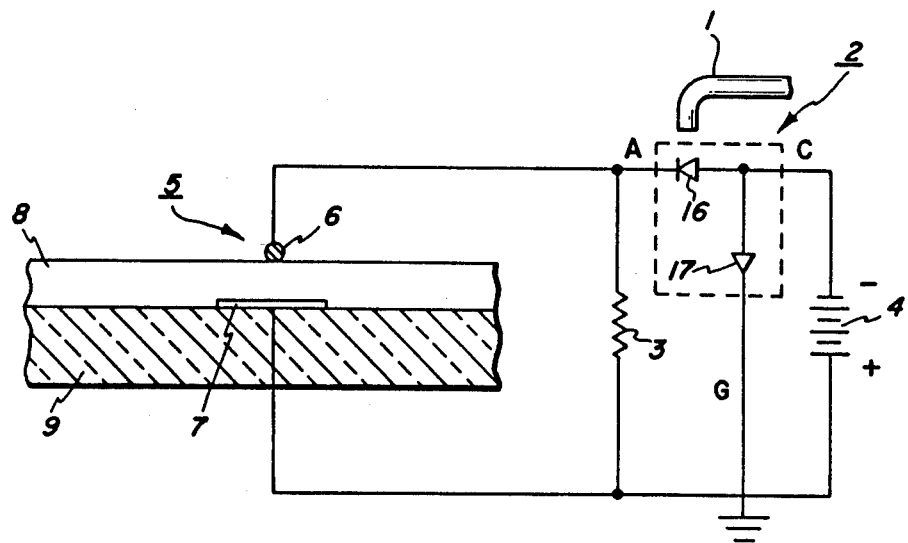
FIG. 1 shows schematically and in cross-section the apparatus of the present invention.

Referring more specifically to FIG. 1 there is shown an apparatus for amplifying a modulated light signal propagated through first waveguide means 1. The apparatus includes photodiode arrangement 2. Arrangement 2 comprises photoactive photodiode 16 and grounded guard ring 17. Arrangement 2 is electrically connected to the negative terminal of D.C. power source 4 and to electrode 6 of electrode set 5. Electrode 6 contacts one side of elastomeric waveguide 8. Waveguide 8 rests on support medium 9. Electrode 7 contacts the opposite side of waveguide 8 and is electrically connected to the positive terminal of power source 4. Resistor 3 is placed across the circuit between arrangement 2 and the positive terminal of power source 4.

Any suitable first waveguide means 1 may be used to bring an optical signal to the amplifying apparatus. Such waveguides are well known in the art and are typified by those disclosed, for example, in U.S. Pats. Nos. 3,399,012; 3,740,113; 3,843,229 and 3,884,550.

Any suitable photodiode arrangement and resistor combination may be used. As is well known, photodiodes are electrically relatively resistive in the dark and relatively conductive when struck by light. A suitable photodiode-resistor combination is one in which the resistance of the photodiode in the dark is at least about 10 times that of the resistor and in the light the resistance of the photodiode is about 1/10 that of the resistor. Any combination of resistor and photodiode which meet this criteria may be used. It is to be understood that any of the well known photodiode arrangement may be used provided they supply the required light-/dark resistivity relative to the resistor.

The D.C. power source may be any such source suitable for providing a field between members of the electrode set sufficient to cause a light-modulating deformation in the elastomeric waveguide whenever the photodiode is struck with light. It is understood that the strength of a suitable such D.C. power source will vary depending on such factors as the resistive strength of the resistor, the thickness of the elastomeric waveguide and the cross-sectional shape of the members of the electrode set.

It will be readily understood by those skilled in the art that the response frequency (RC) of such a circuit is limited according to the formular $RC \leq 1/2\omega_{max}$ where R is the load resistance, C. is the capacitence of the photodiode or the modulator, whichever is greater, and $\omega_{max}$ is the maximum desired frequency of modulation.

The elastomeric waveguide may be formed from any suitable material. Useful materials are known in the art. The elastomer, to be useful, should have a greater index of refraction than the support medium to which it is adjacent. The elastomer should also be one that is capable of being easily deformed by the physical pressure of the electrode set. Preferably the deformation should be possible at a relatively high frequency. A wide variety of elastomers may be selected to meet these requirements. Two such examples include phenylmethyl polysiloxane ($n=1.54 - 1.55$ at 632.8 nm) and dimethyl polysiloxane($n = 1.40 - 1.41$ at 632.8 nm) crosslinked to the desired elastomeric state. Both of these materials are deformable at a frequency of about 100KHz.

Likewise, a wide variety of materials are useful as a support medium. The criteria for selection of the support medium are that it possess the requisite mechanical properties, e.g., strength and compatibility with the elastomeric waveguide material, and that its index of refraction is substantially lower than that of the elastomeric waveguide material. By way of example, a Pyrex microscope glass ($n = 1.513$ at 632.8 nm) is a suitable support medium where phenylmethyl polysiloxane film is employed. Also by way of example, lithium fluoride ($n = 1.39$ at 632.8 nm) and sodium fluoride ($n = 1.38$ at 632.8 nm) may be used with elastomer waveguide films comprised of dimethyl polysiloxane.

Any suitable electrode configuration may be used as members of the set of electrodes which contact opposite sides of the elastomeric waveguide. The electrodes should be in contact with the elastomeric material without deforming it in the absence of a field between the electrodes. Further, the electrodes should be shaped and arranged so that in the presence of a field of sufficient strength the electrodes are drawn toward one another sufficiently to cause a light-modulating deformation in the surface of the elastomeric waveguide. In a typical exemplary embodiment such as that shown in FIG. 1, one electrode of the set is a silvered area sandwiched between the support medium and the elastomer waveguide material and the other electrode of the set is a wire in contact with the opposite side of said guide. Preferably, the wire electrode is formed of tungsten filament 0.5-25 microns in diameter and extends transversely across the elastomeric waveguide. In one preferred embodiment, for example, said other electrode comprises a plurality of such filaments held in contact with the elastomeric waveguide by a yoke.

Figure 2:
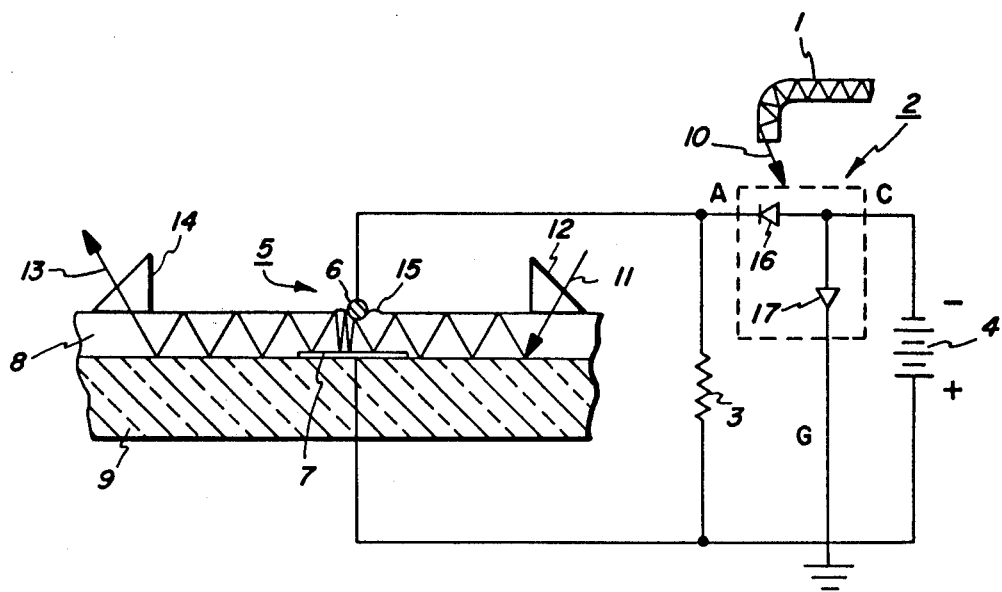
FIG. 2 shows schematically and in cross-section the apparatus of the present invention in operation.

Referring more specifically to FIG. 2, the amplifier arrangement of FIG. 1 is shown in operation. Low intensity optical signal 10 propagates through first waveguide means 1 and registers on photodiode 2. The registering of optical signal 10 on photoresponsive photodiode 16 causes the photodiode's resistivity to drop to well below that of resistor 3 so that D.C. power source 4 creates a field between electrodes 6 and 7 of electrode set 5. The field is of sufficient strength to urge the electrodes toward each other causing light-modulating deformation 15 in elastomeric waveguide 8.

Unmodulated high intensity light 11 from the source (not shown) enters elastomeric waveguide 8 through first prism coupler 12 and propagates unmodulated in the direction shown along guide 8 until it impinges the deformed area of the surface of guide 8 and is modulated. The high intensity modulated light 13 then propagates further along guide 8 and exits through second prism coupler 14.

It will be apparent to those skilled in the art that high intensity modulated light 13 will be modulated with a 180° phase shift to the modulation of low intensity optical signal 10. However, such a phase shift in modulation is largely irrelevant to most uses of optical signals, e.g., conversion to audible sounds or further long distance transmission. The high intensity modulated light 13 is an amplified optical signal corresponding to low intensity optical signal 10. It is clear that, if desired, a second 180° phase shift can be accomplished by passing the high intensity optical signal through yet another amplifying arrangement.

It is to be pointed out that the first and second optical couplers 12 and 14 are not a required part of the invention. High intensity unmodulated light can be produced in guide 8 by any suitable means. For example, the apparatus disclosed in copending application Ser. No. 621,313 filed Oct. 10, 1975, can be used. In that apparatus, light 11 is produced by a feedback laser of which the elastomeric waveguide is an integral part. In like manner the amplified optical signal can remain in guide 8 for further use or be coupled into other waveguides by other types of couplers such as those disclosed, for example, in U.S. Pats. Nos. 3,912,364 and 3,928,102.

DESCRIPTION OF THE PREFERRED EMBODIMENT

The best mode of making and using the optical signal amplifier of the present invention will now be described by way of example with sufficient detail and clarity to enable one skilled in the art to make and use the invention.

Phenylmethyl polysiloxane cyclics for use in forming an elastomeric waveguide are prepared following the procedure outlined in U.S. Pat. No. 3,546,265:

100cc of isopropyl ether and 75g. of concentrated HCl are charged into a flask. This charge is heated to 50°-55° C and a feed of 191.0g. of $MeSiCl_2$ in 100cc of isopropyl ether is added dropwise to the charge while stirring for more than 1½ hours.

After addition of the feed is completed, the mixture is stirred for an additional 30 minutes at 50°-55° C and then cooled to 25° C.

This cooled mixture is given a first wash with 150cc of $NaCl—H_2O$ and the $HCl—H_2O$ bottom layer is siphoned off.

A second and third wash of 150cc of 2% in a $NaHCO_3—H_2O$ solution is given to a slightly alkyline pH.

Several subsequent washes with 150cc of NaCl—H20 are given to a neutral pH.

The mixture is then filtered and vacuum stripped to remove the isopropyl ether, resulting in a yield of 117.0g. of crude product.

This product is then vacuumed distilled to produce a mixture of $(\phi MeSiO)_3$, b.p. about 180° C/2mm and ( $MeSiO)_4$. b.p. about 237° C/2mm and a total weight of 85.0g.

Phenylmethyl polysiloxane gum stock containing reactive pendant amine crosslinking sites is prepared as follows:

The following is charged into a beaker:
8.0g. of the (MeSiO)$_x$ cyclics
2.0g. of (Me$_2$SiO)$_4$ cyclic tetramer
0.2g. of ($\Delta$-NH$_2$Bu MeSiO)$_x$ cyclics 100ppm. of tetramethyl ammonium silanolate catalyst The beaker is sparged with nitrogen and placed in a 95° C vacuum oven at full vacuum. After 3 hours, the temperature is raised to 150° C for 2 hours to decompose the catalyst and remove fragment molecules. The resulting product is a clear, somewhat sticky gum. This gum is then completely dissolved in benezene and a ratio of 20 weight percent solids to benezene.

2.0g. of the above product solution is mixed with 0.1g. of a crosslinking solution of the acetone oxime adduct of tolene-2,4-diisocyanate (5 weight percent in tetrahydrofuran) and coated on a prepared Pyrex glass slide substrate and the solvent evaporated. The desolvated film is crosslinked (cured) by heating at 60° C for about 30 minutes to form an elastomeric waveguide.

The Pyrex glass slide is prepared prior to coating with the elastomer by vacuum coating onto its surface across its short dimension a 1000 angstrom thick strip of silver. The silver strip will serve as one electrode of a set of electrodes.

The waveguide layer has a thickness of about 6 microns and an index of refraction (n) of 1.40 at 632.8 nm The second electrode is a 1 mil diameter tungsten wire which is fixed in an insulating yoke and positioned across the elastomeric waveguide parallel with the silvered strip.

The tungsten wire and the silver strip are connected in parallel to an Ohmite (2W) 10$^5$ohm resistor, and the resistor is connected in parallel to a SGD444 photodiode available from EC&G Electro-optic Division having a dark resistance of about 10$^9$ ohm and a light resistance of about 10$^4$ ohms.

Included in one of the connections between the photodiode and the resistor is a 150v. D.C. power source. A 10mA. current and a maxiumu response frequency (RC) of 100 KHz is provided by the circuit.

A Schott SF18 glass prism (30°/60°) is placed on the elastomeric waveguide on either side of the tungsten wire to provide an entry and exit path for high intensity light. High intensity light having a wavelength of 632.8 nm is generated by a HeNe laser and directed into the entry prism. It is observed to propagate through the waveguide and exit through the exit prism unmodulated.

Low intensity light from a sound/light transducer is produced by sensing ordinary conversation and low intensity light from the transducer is directed onto the photodiode which is otherwise in the dark.

The light eminating from the exit prism adjacent the elastomeric waveguide is then passed through a light-sound transducer and the sounds of the original conversation are reproduced.

The intensity of the light from the original sound-light transducer is diminished by filtering to a variable level of intensity. No reduction in the light intensity, volume or clarity of sound is observed and heard at the exit prism and light-sound transducer.

EXAMPLE II

Substantially the same results are observed when the elastomeric waveguide is prepared as follows:

9.9g. of the (OMeSiO)$_x$ cyclics prepared as set forth in Example I are charged into a flask along with 0.1g. of (methylvinyl SiO)$_x$ cyclics. This mixture is heated to 90° C and sparched with nitrogen for 15 minutes.

40-45 ppm of the catalyst set forth in Example I is added to the flask and heated at 90° C for 3 ½ hours. This mixture is then heated to 140° C for 2 hours to decompose the catalyst.

The mixture is cooled to room temperature and dissolved in benzene (20 weight percent solids).

0.1g. of benzophenone (a sensitizer for absorbing ultraviolet light) and 0.1g. of tetramethyl diisiloxane is added to this mixture. The mixture is then coated on a Pyrex glass slide as in Example I, and desolvated by evaporation with exposure to 4 w. ultraviolet light for 30 minutes to cure the film to form the waveguide.

It will be understood that the embodiments of the present invention which have been described are merely illustrative of a few of the applications of the principles of the invention. Numerous modifications may be made by those skilled in the art without departing from the true spirit and scope of the invention.

What is claimed is:

1. An apparatus for amplifying a modulated light signal propagating through a first optical waveguide, which comprises:

a set of electrodes, the members of said set of electrodes being arranged to contact opposite sides of an elastomeric optical waveguide having unmodulated light of high intensity propagating therethrough such that a light-modulating deformation of said elastomeric optical waveguide occurs whenever a field of sufficient strength is established between said members, said set being electrically connected to a circuit such that said one member of said set of electrodes is electrically connected to the positive terminal of a D.C. power source and the opposing member of said set of electrodes is connected through a photodiode adapted for registering said signal to the negative side of said D.C. power source a resistor being placed across the circuit between said photodiode and the positive terminal of said D.C. power source, said resistor having a resistance of not more than about 1/10 the dark resistance of the photodiode, and the photodiode having a light resistance of not more than about 1/10 the resistance of the resistor, the frequency response of the apparatus being not greater than $1/2\omega_{max}$ where $\omega$ max equals $2\pi$ times the maximum modulation frequency, whereby the resistance of the photodiode when struck by modulated light from the first optical waveguide is sufficiently reduced to result in a field between said electrodes and a corresponding light-modulating deformation of the elastomeric optical waveguide such that the high intensity light output from the elastomeric optical waveguide is modulated corresponding to the modulation of said signal.

* * * * *